W. E. BARNES.
VALVE.
APPLICATION FILED MAY 11, 1910.

980,585.

Patented Jan. 3, 1911.

Witnesses:
Josephine H. Ryan
Charles D. Woodbury

Inventor:
Walter E. Barnes,
by Roberts, Roberts & Cushman,
Attorneys.

UNITED STATES PATENT OFFICE.

WALTER E. BARNES, OF MALDEN, MASSACHUSETTS.

VALVE.

980,585.  Specification of Letters Patent.  Patented Jan. 3, 1911.

Application filed May 11, 1910. Serial No. 560,543.

*To all whom it may concern:*

Be it known that I, WALTER E. BARNES, a citizen of the United States, and resident of Malden, in the county of Middlesex and State of Massachusetts, have invented new and useful Improvements in Valves, of which the following is a specification.

This invention relates to valves, and particularly to valves of the quick-opening type designed to control the admission of steam or water to the radiators of a heating system.

The principal object of the invention is to provide a new and improved construction of quick-opening valve in which the valve is operated by a stud engaging a helical cam path of high or quick pitch, that portion of the cam path which effects the final closing of the valve being of less pitch or inclination than the rest of the path, and the stud being made with a flattened surface to bear on the less inclined portion of the cam path, and to stand clear of other portions of the cam path, thus enlarging the bearing surface and reducing the effects of wear between the stud and cam path at the place where they are subjected to the greatest friction and wear.

Figure 1:
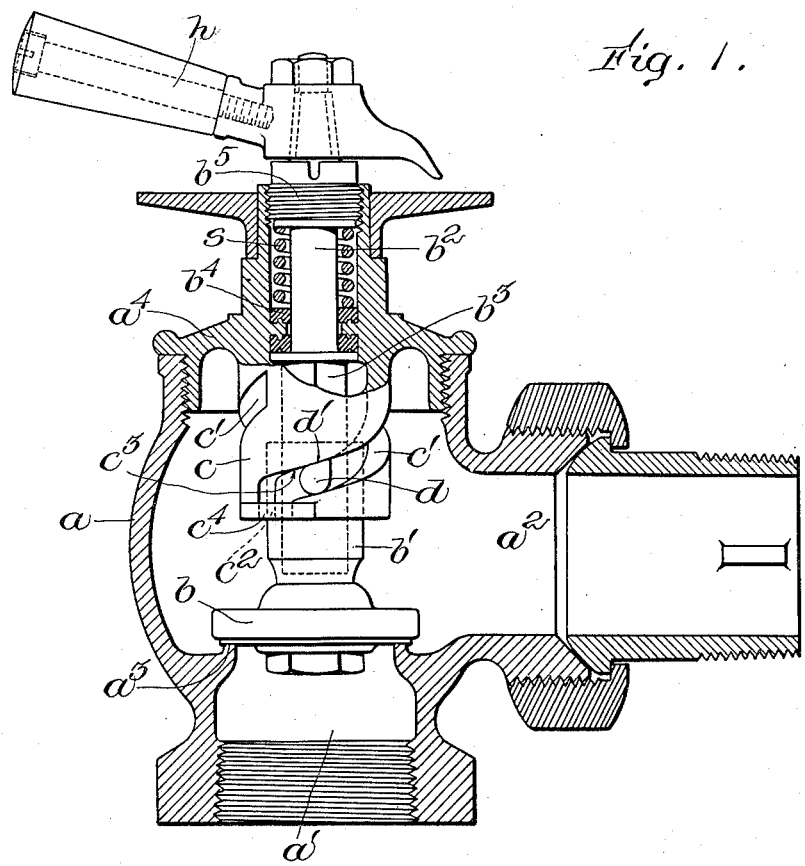
Figure 2:
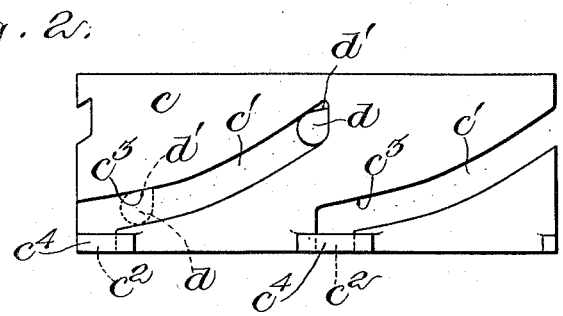

In the accompanying drawings, which illustrate one embodiment of the invention,—Figure 1 is a vertical central section, partly in elevation, of a valve embodying my invention; and Fig. 2 is a development of the cam path and stud valve-operating connection illustrated in Fig. 1.

The valve casing comprises the body $a$, having the admission or inlet port $a'$ and the outlet port $a^2$. The inlet port is surrounded by a valve seat $a^3$ controlled by a valve $b$. The upper end of the body $a$ is interiorly screw threaded, as shown, and the exteriorly threaded cap $a^4$ is screwed therein.

The valve stem which passes upward through the cap $a^4$, is composed of two telescoping parts $b'$ and $b^2$. The lower section of the stem $b'$ on which the valve $b$ is mounted, is made hollow, and its bore is made square to fit the squared end $b^3$ of the upper section $b^2$ of the stem, so that the section $b^2$ will turn with section $b'$ but may slide therein lengthwise. The joint between the stem section $b'$ and the valve $b$ may be of an universal type such as the ball-and-socket joint, as is usual in valves of this class, to insure the self adjustment of the valve upon its seat. Any suitable packing arrangement about the stem section $b^2$ may be employed, such as the packing $b^4$ held in place by spring $s$, which abuts against a bushing $b^5$ screwed into the hub formed on the outer side of a cap $a^4$. The valve stem is operated by a handle $h$ secured to the outer end thereof.

Made integral with the cap $a^4$ and extending into the casing about the valve stem, is a sleeve $c$, provided with two oppositely disposed helical slots or grooves $c'$ forming helical cam paths for actuating the valve stem section $b'$. These cam paths have a quick or high pitch, so that the full opening or closing of the valve may be accomplished within a half rotation of the valve handle. By reference particularly to Fig. 2 it will be seen that the cam paths are not straight but are curved so that the lower parts thereof, $c^3$, which effect the final closing of the valve, have relatively less pitch or inclination than the other parts of the paths. Each slot $c'$ has an opening $c^2$ through the end of the sleeve $c$ to admit the cam following studs presently to be described. The openings $c^2$ may be bridged over as shown at $c^4$ to strengthen the slotted sleeve $c$.

Secured to the sides of the stem section $b'$ are the studs $d$, one at each side, projecting into the grooves $c'$. Each stud $d$ is made with a flattened surface $d'$ adapted to engage the less inclined portion $c^3$ of the cam path, as the valve approaches its closed position, but standing clear of other portions of the cam path. Two positions of the stud $d$ are shown in Fig. 2, the lower position showing the flattened bearing surface of the stud engaging the less inclined portion $c^3$ of the cam path, and the upper position showing the flattened surface of the stud standing clear of the cam path, which is engaged by the curved or convex surface of the stud. Thus, by reason of the variation in pitch or inclination of different parts of the cam path and the provision of a broad flattened surface on the cam follower, arranged to engage a portion of the cam path but to stand clear of other portions, a bearing surface is provided adapted to resist wear at a point where the greatest wear comes, dispensing with the necessity of frequent adjustment required to compensate for the effects of wear where a curved or convex surface bears against a cam path.

It will be understood that by using the expression "flattened surface" used throughout the specification and claims, I do not intend to imply that the surface $d'$ lies in a mathematically flat plane. The condition to be observed is that the surface $d'$ shall be flattened sufficiently to engage and afford a broad bearing surface with the cam path $c^3$; and as the cam path $c^3$ in the exemplification shown in the drawings is not straight but slightly curved or convex, the flattened surface $d'$ of the stud will not be literally flat, but slightly concaved to fit the surface $c^3$.

What I claim and desire to secure by Letters Patent is:

1. In a valve, a casing, a valve therein having a rotatable stem, and connection between said casing and said valve stem comprising a stud fast on one of said members and a helical cam path for said stud on the other member, the portion of said cam path which effects the final closing of the valve having relatively less pitch or inclination than the rest of the path, and said stud having a flattened bearing surface arranged to bear on said less inclined portion of the cam path and to stand clear of other portions of said cam path.

2. In a valve, a casing, a valve therein having a rotatable stem, a sleeve in said casing, through which said valve stem passes, provided with a helical cam path, a stud fast on said valve stem engaging said cam path, the portion of said cam path which effects the final closing of the valve having relatively less pitch or inclination than the rest of the path, and said stud having a flattened bearing surface arranged to bear on said less inclined portion of the cam path and to stand clear of other portions of said cam path.

3. In a valve, a casing, a valve therein having a rotatable valve stem comprising two telescoping sections, the section of said stem on which the valve is mounted being hollow and the other section extending into and adapted to turn said hollow section, said hollow section having a stud fast to the side thereof, and a sleeve secured within said casing surrounding said hollow section and provided with a helical cam path, that part of said cam path which effects the final closing of the valve having less inclination than other parts, and said stud having a flattened bearing surface arranged to bear on said less inclined portion of the cam path and to stand clear of other portions of said cam path.

Signed by me at Boston, Massachusetts, this 7th day of May 1910.

WALTER E. BARNES.

Witnesses:
ROBERT CUSHMAN,
CHARLES D. WOODBERRY.